(12) United States Patent
Brown et al.

(10) Patent No.: US 12,141,916 B2
(45) Date of Patent: Nov. 12, 2024

(54) MARKERLESS MOTION CAPTURE OF HANDS WITH MULTIPLE POSE ESTIMATION ENGINES

(71) Applicant: Hinge Health, Inc., San Francisco, CA (US)

(72) Inventors: Colin Joseph Brown, Montreal (CA); Wenxin Zhang, Montreal (CA); Dalei Wang, Montreal (CA)

(73) Assignee: Hinge Health, Inc., San Francisco, CA (US)

(*) Notice: Subject to any disclaimer, the term of this patent is extended or adjusted under 35 U.S.C. 154(b) by 92 days.

(21) Appl. No.: 17/906,854

(22) PCT Filed: Mar. 20, 2020

(86) PCT No.: PCT/IB2020/052600
§ 371 (c)(1),
(2) Date: Sep. 20, 2022

(87) PCT Pub. No.: WO2021/186222
PCT Pub. Date: Sep. 23, 2021

(65) Prior Publication Data
US 2023/0141494 A1 May 11, 2023

(51) Int. Cl.
*G06T 17/00* (2006.01)
*G06T 7/70* (2017.01)
(Continued)

(52) U.S. Cl.
CPC .............. *G06T 17/00* (2013.01); *G06T 7/70* (2017.01); *G06T 11/00* (2013.01); *G06V 10/25* (2022.01); *G06T 2207/20016* (2013.01)

(58) Field of Classification Search
CPC . G06T 17/00; G06T 7/70; G06T 11/00; G06T 2207/20016; G06T 2207/20084;
(Continued)

(56) References Cited

U.S. PATENT DOCUMENTS 7,804,998 B2  9/2010 Muendermann et al.
8,023,726 B2  9/2011 Sundaresan et al.
(Continued)

FOREIGN PATENT DOCUMENTS

JP  2020042476 A  3/2020
WO  2014154839 A1  10/2014

OTHER PUBLICATIONS

Cao, Zhe , "OpenPose: Realtime Multi-Person 2D Pose Estimation using Part Affinity Fields", arxiv.org, Cornell University Library, 201 Olin Library Cornell University Ithaca, NY 14853, XP081364956,, Dec. 18, 2018, 14 pages.

(Continued)

*Primary Examiner* — Vijay Shankar
(74) *Attorney, Agent, or Firm* — Hinge Health, Inc.

(57) ABSTRACT

An example of an apparatus for markerless motion capture is provided. The apparatus includes cameras to capture images of a subject from different perspectives. In addition, the apparatus includes a pose estimation engines to receive the images. Each pose estimation engine is to generate a coarse skeletons of the received image and is to identify a region of the image based on the coarse skeleton. Furthermore, the apparatus includes pose estimation engines to receive the regions of interest previously identified. Each of these pose estimation engines is to generate a fine skeleton (Continued)

of the region of interest. In addition, the apparatus includes attachment engines to generate a whole skeletons. Each whole skeleton is to include a fine skeleton attached to a coarse skeleton. The apparatus further includes an aggregator to receive the whole skeletons. The aggregator is to generate a three-dimensional skeleton from the whole skeletons.

18 Claims, 4 Drawing Sheets

(51) Int. Cl.
  *G06T 11/00* (2006.01)
  *G06V 10/25* (2022.01)
(58) Field of Classification Search
  CPC . G06T 2207/30196; G06T 7/75; G06T 7/251; G06F 3/011; G06F 3/014; G06F 3/017; G06V 10/25; G06N 3/045
  See application file for complete search history.

(56) References Cited

U.S. PATENT DOCUMENTS

| | | | |
|---|---|---|---|
| 9,058,514 | B2 | 6/2015 | Kim et al. |
| 11,354,817 | B2 * | 6/2022 | Brown ............ G06N 3/045 |
| 11,875,529 | B2 * | 1/2024 | Brown ............ G06T 7/73 |
| 2013/0195330 | A1 * | 8/2013 | Kim ............ G06V 40/10 |
| | | | 382/128 |

OTHER PUBLICATIONS

Hu, Jhen-Jia, et al., "3D hand posture estimation and task semantic monitoring technique for human-robot collaboration", 2013 IEEE International Conference on Mechatronics and Automation, XP032494252, DOI: 10.1109/ICMA.2013.6618018, ISBN: 978-1-4673-5557-5, Aug. 4, 2013, pp. 797-804.
Tomas, Simon, et al., "Hand Keypoint Detection in Single Images using Multiview Bootstrapping", arxiv.org, Cornell University Library, 201 Online Library Cornell University Ithaca, NY XP080765451, DOI: 10.1109/CVPR.2017.494, Apr. 25, 2017, 9 pages.
Mathis et al.; "Markerless tracking of user-defined fetures with deep learning"; retrieved online from url: https://arxiv.org/abs/1804.03142; Apr. 9, 2018; pp. 1-14.
Zimmermann et al.; "FreiHAND: A Dataset for Markerless Capture of Hand Pose and Shape from Single RGB Images"; retrieved online from url: https://arxiv.org/abs/1909.04349; Sep. 2019; pp. 813-822.
Watanabe, Naoto, "Body, hands and face motion capture from full high-definition television camera", ITE Technical Report, Japan, The Institute of Image Information and Television Engineers, vol. 32, No. 58, Dec. 18, 2008, pp. 61-64.

* cited by examiner

MARKERLESS MOTION CAPTURE OF HANDS WITH MULTIPLE POSE ESTIMATION ENGINES

CROSS-REFERENCE TO RELATED APPLICATION

This application is a national stage entry of International Patent Application No. PCT/IB2020/052600, filed on Mar. 20, 2020, and titled "MARKERLESS MOTION CAPTURE OF HANDS WITH MULTIPLE POSE ESTIMATION ENGINES," which is incorporated by reference herein in its entirety.

BACKGROUND

Motion capture is a general field that involves the recording of movements of people, animals, or objects. Motion capture may be used in in various applications such as computer-generated imagery in the film, video games, entertainment, biomechanics, training videos, sports simulators, and other arts. Conventionally, motion capture of fine movements, such as with the fingers on the hands of a person are carried out by attaching markers on the portions of the subject carrying out the fine motions. The markers may be placed at specific locations, such as at joints as well as between joints to allow for easy tracking of motion. The markers used are not particularly limited and may involve active or passive markers that allow a camera system to easily identify the marker for image processing. In some examples, markers may be pre-positioned on a wearable apparatus, such as a glove or piece of clothing.

BRIEF DESCRIPTION OF THE DRAWINGS

Reference will now be made, by way of example only, to the accompanying drawings in which.

DETAILED DESCRIPTION

Motion capture techniques using markers attached to a subject are known. In addition, markerless motion capture systems where motion capture is carried out without the use of markers is increasing in popularity. Markerless motion capture techniques provide a natural experience where a subject does not have motion limited by markers attached thereto. For example, markers may bump into the environment or other markers that may result in errors. In particular, for motion capture of a person using markers, markers are typically embedded on a special suit that is custom sized to the person. In addition, the suit may preclude wearing of a costume or other makeup which may be desirable to capture simultaneously. Furthermore, the markers may use special lighting, such as infrared to be detected robustly. Markerless motion capture allows a subject to wear a wider variety of costumes and uses less hardware to implement. However, markerless motion capture typically has lower fidelity and is capable of tracking fewer joints than a motion capture system using a marker system.

In particular, markerless motion capture of a subject may have difficulty tracking smaller portions of a subject when the motion capture is of an entire subject. For example, if the subject for motion capture is a human subject, movements of the hands may be difficult to capture since they are on such a smaller scale. Generally, the hands of a human subject are detailed and contribute significantly to the motion of the subject. In particular, the hands may often be used to manipulate objects in the environment. Accordingly, if the motion capture of the hands is not correct, the movements of the human subject may appear to be unnatural.

Various apparatus operating together in a system in accordance with a method of providing markerless motion capture of the hands using multiple pose estimation engines is provided. The system may use multiple computer vision based pose estimation engines processing multiple views to capture the motion of hands of a human subject using markerless motion capture processes. In particular, the system may generate a pose for the subject as a whole and perform an additional pose estimation on a portion of the subject, such as the hands, extracted from the main image.

In the present description, the apparatus and methods discussed below are generally applied to a human subject with a focus on the hands of the human subject. It is to be appreciated by a person of skill with the benefit of this description that the examples described below may be applied other portions of the human subject such as capturing facial expressions. In addition, other subjects are contemplated as well, such as animals and machines having a small portion of the subject engaged in fine intricate movements to be captured.

Figure 1:
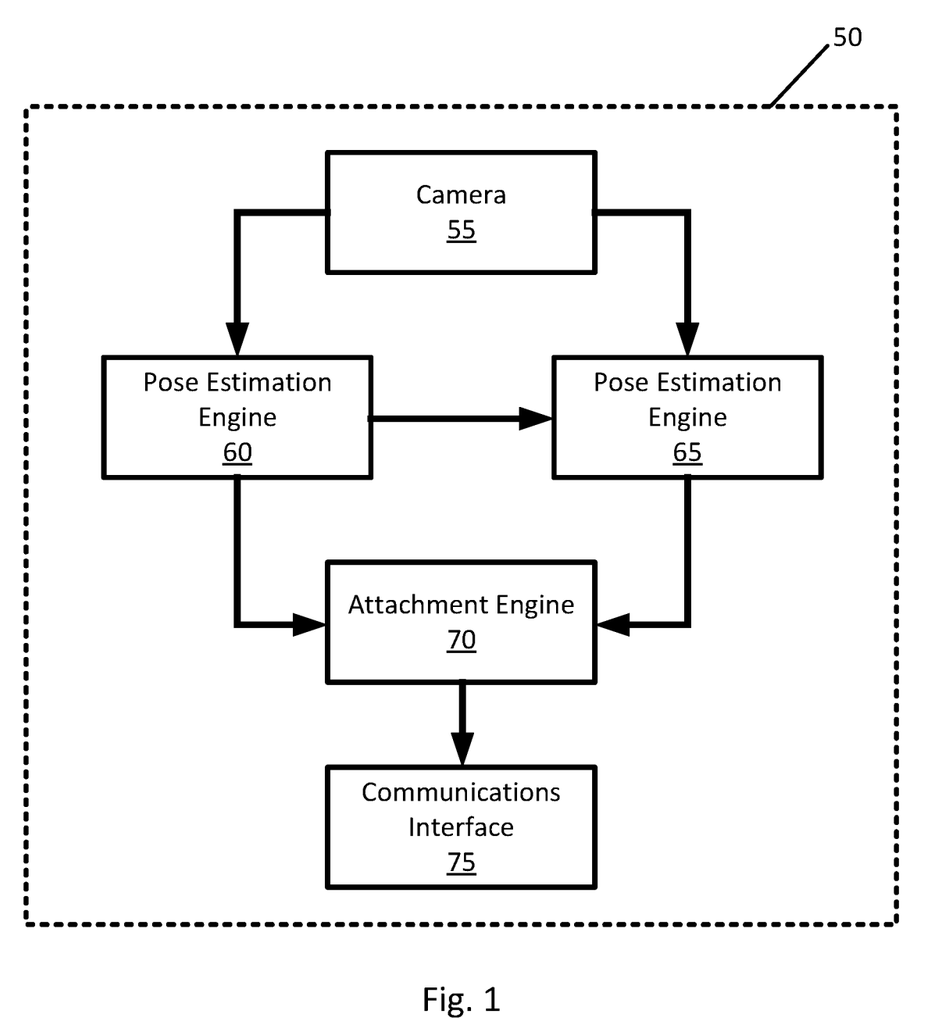
FIG. 1 is a schematic representation of the components of an example apparatus for markerless motion capture.

Referring to FIG. 1, a schematic representation of an apparatus for markerless motion capture is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus operates, updating parameters of the apparatus 50, or resetting the apparatus 50. In the present example, the apparatus 50 is to capture an image or video for motion capture and to generate a skeleton with fine details in a region of interest, such as the hands on a human subject. In the present example, the apparatus 50 includes a camera 55, a first pose estimation engine 60, a second pose estimation engine 65, an attachment engine 70, and a communications interface 75.

In the present example, the apparatus 50 may also include a memory storage unit (not shown) that may be used to store instructions for general operation of the apparatus 50 and its components. In particular, the instructions may be used by a processor to carry out various functions. In other examples, the apparatus 50 may receive instructions from a separate source, such as an external server to direct a processor. In further examples, each component of the apparatus 50 may be a stand-alone component operating independently from any central control.

The camera 55 is to collect data in the form of images or videos. In particular, the camera 55 may be a high resolution digital video recorder to capture an image of a subject in motion. In the present example, a video may be a collection of images captured at a specified frame rate. Accordingly, it is to be understood by a person of skill with the benefit of this description, that each frame or image of the video may be processed separately during motion capture and recombined after processing to provide motion capture. In some examples, frames may be sampled at a slower rate for motion capture, such as every other frame or every few frames, to reduce the demand on computational resources. For example, the camera 55 may capture the image of a human subject. In some examples, the camera 55 may include a motion tracking to follow the motion of a specific subject, such as on a stage or in a sporting arena. The camera 55 is not particularly limited and the manner by which the camera 55 captures images is not limited. For example, the camera 55 may include various optical components to focus light onto an active pixel sensor having a complementary metal oxide semiconductor to detect light signals. In other examples, the optics may be used to focus light onto a charged coupled device.

The pose estimation engine 60 is in communication with the camera 55 to receive an image from the camera 55 for processing. It is to be appreciated by a person of skill in the art with the benefit of this description that the pose estimation engine 60 may receive a plurality of images or video data. The image received at the pose estimation engine 60 may be used to generate a coarse skeleton of a subject in the image. In the present example, the image may include a two-dimensional representation of a human subject. Accordingly, the pose estimation engine 60 may generate a skeleton of the body of the human subject having connected joints. Accordingly, each joint may represent an anatomical location or landmark on the human subject having an approximate rotation. For example, a joint in the skeleton may represent an elbow, shoulder, knee, hip, etc.

In some examples, the pose estimation engine 60 may also reduce the resolution of the image captured by the camera 55 to increase the performance of the apparatus 50. For example, if the image captured by the camera 55 is a high resolution image, the image data may be scaled down to a lower resolution, such as 512×384, which may be sufficient for generating the coarse skeleton.

The manner by which the pose estimation engine 60 generates the skeleton is not limited and may involve a markerless pose estimation process using image processing techniques. It is to be appreciated that in some examples, the pose estimation engine 60 may be an external device to which image data is to be sent and data representing a skeleton is to be received in response. Accordingly, the pose estimation engine 60 may be part of a separate system dedicated to image processing, such as a web service, and may be provided by a third party. In the present example, the pose estimation engine 60 may apply a machine learning technique such as a neural network to generate the skeleton and to infer joint positions and rotations. In a particular, a convolutional neural network may be used in some examples to infer the joint positions and rotations. In other examples, other machine learning models capable of representing features to detect and localize likenesses of parts of the human body may be used for human pose estimation such as convolutional neural networks including fully convolutional models or other machine models such as random forests, other deep neural networks, recurrent neural networks or other temporal models.

It is to be appreciated by a person of skill in the art that the pose estimation engine 60 may use a model that is a top-down architecture, such as Mask-R-CNN type models that first detect regions of interest (ROIs) and then infer details such as human skeletons in each ROI, a bottom-up architecture, such as VGG19 that detect joints across the entire input image and then cluster joints into humans, or other architectures, such as hybrid architectures. The pose estimation engine 60 may infer joints as heatmaps with peaks on different maps representing detections of joints of different kinds or in other representations, such as vectors of joint co-ordinates. The pose estimation engine 60 may also output other maps such as bone affinity maps or other maps such as instance masks and part masks, which may be used to aid clustering of joints into skeletons. In the present example, the pose estimation engine 60 further identifies a region in the two-dimensional image received from the camera 55 that is of interest. The region of interest is not particularly limited and may be automatically selected or selected based on input received from an external source, such as a user. The manner by which the region of interest is selected is not particularly limited. Continuing with the present example of a human subject in the image, the position of a region of interest may be automatically selected based on the inferred locations of other known joints, such as a left or right wrist joint, and or other information, prior knowledge, learned function or heuristics, such as the typical location of the center of a palm given the inferred direction of the fore-arm. The size of a region of interested may also be automatically selected based on, for example the inferred height of the person overall and the typical relative size of the hand compared to the height of a person, or relevant information, learned function or heuristics, such as the length of the inferred forearm. In other examples, the region of interest may be another portion of the human pose with fine details such as a face. In the present example, the pose estimation engine 60 identify the region by defining boundaries within the image. In other examples, the pose estimation engine 60 may crop the original image to generate a smaller image.

The pose estimation engine 65 is in communication with the pose estimation engine 60 to receive a region of interest of an image originally captured by the camera 55. In some examples, the pose estimation engine 65 may receive the image directly from the camera 55 and a boundary definition of a region of interest from the pose estimation engine 60. In particular, for examples, where the pose estimation engine 60 reduces the resolution of the original image, the pose estimation engine 65 is to receive the original image at full resolution to crop the region of interest based on the boundaries received from the pose estimation engine 60. In other examples, the pose estimation engine 65 may receive a cropped image from the pose estimation engine 60. The pose estimation engine 65 is to generate a fine skeleton of a portion of the subject in the region of interest. Continuing with the example above where the region of interest is a two-dimensional representation of a portion of the human subject, such as a hand. Accordingly, the pose estimation engine 60 may generate a skeleton of the hand having connected joints. Accordingly, each joint may represent a point of the hand having an approximate rotation. For example, a joint in the skeleton may represent an interphalangeal joint, metacarpophalangeal joint, or a combination of joints, such as in the wrist.

The manner by which the pose estimation engine 65 generates the fine skeleton is not limited and may involve a markerless pose estimation process using image processing techniques applied only on the region of interest instead of applied to the entire subject as with the pose estimation engine 60. It is to be appreciated that in some examples, the pose estimation engine 60 may be an external device to which image data is to be sent and data representing a skeleton is to be received in response. Accordingly, the pose estimation engine 60 may be part of a separate system dedicated to image processing, such as a web service, and may be provided by a third party. In the present example, the pose estimation engine 65 operated similarly to the pose estimation engine 60 and may apply a machine learning technique such as a neural network to generate the skeleton and to assign joint positions and rotations. In a particular, another convolutional neural network may be used in some examples and applied to the cropped image. It is to be appreciated by a person of skill with the benefit of this description that by limiting the application of the neural network to the portion of the image that more details may be extracted from image such that individual joints in the hand may be identified or inferred to improve the motion capture.

The attachment engine 70 is to generate a whole skeleton from the coarse skeleton generated by the pose estimation engine 60 and the fine skeleton generated by the pose estimation engine 65. The manner by which the attachment engine 70 generates the whole skeleton is not particularly limited. For example, the fine skeleton may represent a portion of the subject defined by the region of interest. In this example, the attachment engine 70 may replace the portion of the coarse skeleton generated by the pose estimation engine 60 and replace the portion with the fine skeleton generated by the pose estimation engine 65 which may have more joint positions with associated rotations.

The attachment engine 70 may also smooth the transition from the fine skeleton to the coarse skeleton. The smoothing function carried out by the attachment engine 70 may involve translating the fine skeleton relative to the coarse skeleton to align an attachment point if the generation of the fine skeleton and the coarse skeleton using the pose estimation engine 65 and the pose estimation engine 60, respectively creates a discontinuity when the region of interest is simply replaced. The smoothing function carried out by the attachment engine 70 may also involve scaling the proportions of the fine skeleton to match the proportions of the coarse skeleton.

It is to be appreciated by a person of skill in the art with the benefit of this description that the pose estimation engine 60 may identify multiple regions of interest. For example, the pose estimation engine 60 may identify two hands on a human subject. In addition, the pose estimation engine 60 may also identify a face, a foot or a spine. Furthermore, the pose estimation engine 60 may identify sub-regions of interest, such as a finger or facial feature (e.g. an eye, or lips). Each region of interest may be handled in sequence by the pose estimation engine 65 in some examples. In other examples, the regions of interest may be processed in parallel by the pose estimation engine 65. Other examples may also include additional pose estimation engines (not shown) where the additional pose estimation engines may be used to process additional regions of interest in parallel. In such examples, each pose estimation engine may be specialized to a specific type of region of interest such as a hand of a human subject.

The communications interface 75 is to communicate with an aggregator to which data representing the whole skeleton generated by the attachment engine 70 is transmitted. In the present example, the communications interface 75 may communicate with aggregator over a network, which may be a public network shared with a large number of connected devices, such as a WiFi network or cellular network. In other examples, the communications interface 75 may transmit data to the aggregator via a private network, such as an intranet or a wired connection with other devices.

In the present example, the whole skeleton is a two-dimensional representation of the subject in the image captured by the camera 55. The aggregator may use the whole skeleton generated by the attachment engine 70 along with additional data, such as two-dimensional whole skeletons generated from images captured at different vantage points, to generate a three-dimensional skeleton of the subject in the image. Accordingly, the aggregator may integrate the skeletons from multiple viewpoints or vantage points to generate a three-dimensional skeleton using various three-dimensional imaging techniques. Therefore, once the three-dimensional skeleton is formed, the three-dimensional skeleton may capture details in the region of interest to a level of detail that is generally not captured in the coarse skeleton.

In the present example, the three-dimensional skeleton may be computed by triangulating corresponding points from two-dimensional whole skeletons of the subject from generated from image data captured from different vantage points. The aggregator may employ outlier rejection technique such as random sample consensus (RANSAC) or other similar techniques to discard noisy or erroneous measurements and inferences of two-dimensional whole skeleton joint positions generated from image data from different vantage points. The outlier rejection technique may incorporate weights or confidence measures from skeletons or individual joints from each skeleton to decide how to reject outliers. Triangulation may be computed as part of a Kalman filter framework, combining current and past measurements in a probabilistic framework or may be computed in other ways such as with algebraic approaches or trained machine learning models. In addition, triangulation may also may incorporate weights or confidence measures from skeletons or individual joints of each skeleton to decide how to compute three-dimensional positions and rotations from multiple skeletons generated from image data from different vantage points.

The aggregator may also employ a matching technique in the case of multiple subjects to decide how to match skeletons from images captured from different vantage points such that they correspond to the same persons. To match subjects from different image data, matching techniques may employ various heuristics or machine learning models, and may leverage skeletal features such as positions and velocities or joints or appearance features such as information derived from respective images from each view.

Although the present example contemplates that the whole skeletons used by the aggregator are generated in a similar manner which a fine skeleton is to be attached to a coarse skeleton, other examples may not generate a fine skeleton in the additional data received by the aggregator. For example, the aggregator may us a primary whole skeleton with fine features in a region of interest, but the three-dimensional skeleton may be generated with only additional coarse skeletons. In such examples, since fine skeletons are not generated for each vantage point, the computational resources for the system may be reduced.

In the present example, the manner by which the communications interface 75 transmits the data to the aggregator is not limited and may include transmitting an electrical signal via a wired connection to the aggregator. In other examples, the communications interface 75 may connect to the aggregator wirelessly via the Internet which may involve intermediary devices such as a router or a central controller. In further examples, the communications interface 75 may be a wireless interface to transmit and receive wireless signals such as a Bluetooth connection, radio signals or infrared signals and subsequently relayed to additional devices.

Figure 2:
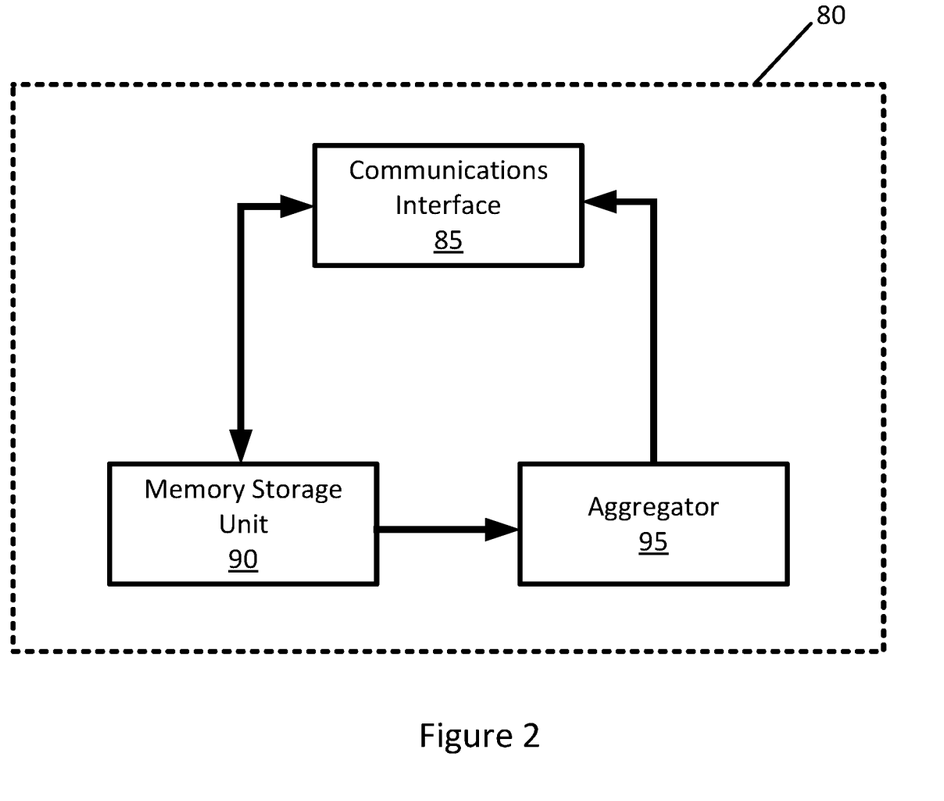
FIG. 2 is a schematic representation of the components of another example apparatus for markerless motion capture.

Referring to FIG. 2, a schematic representation of an apparatus for markerless motion capture is generally shown at 80. The apparatus 80 may include additional components, such as various additional interfaces and/or input/output devices such as indicators to interact with a user of the apparatus 80. The interactions may include viewing the operational status of the apparatus 80 or the system in which the apparatus operates, updating parameters of the apparatus 80, or resetting the apparatus 80. In the present example, the apparatus 80 is to interact with a plurality of devices such as the apparatus 50 to form a three-dimensional skeleton to provide three-dimensional motion capture. The apparatus 80 includes a communications interface 85, a memory storage unit 90 and an aggregator 95.

The communications interface 85 is to communicate with external sources, such as the apparatus 50. In the present example, the communications interface 85 is to receive data representing a whole skeleton generated by combining a coarse skeleton with a fine skeleton by the attachment engine 70. The communications interface 85 may be in communication with multiple apparatus 50, where each apparatus 50 is disposed at a different vantage point to capture a subject. In the present example, the communications interface 85 may communicate with the apparatus 50 in a similar manner as the communications interface 75 described above, such as over a WiFi network or cellular network. In other examples, the communications interface 85 may receive data from the apparatus 50 via a private network, such as an intranet or a wired connection with other intermediary devices.

The memory storage unit 90 is to store data from received from the apparatus 50 via the communications interface 85. In particular, the memory storage unit 90 may store a plurality of whole skeletons that may be combined for motion capture of a subject in a video. It is to be appreciated by a person of skill with the benefit of this description that in examples where whole skeletons from multiple vantage points are received from via the communications interface 85, the memory storage unit 90 may be used to store and organize the whole skeletons with coarse and fine features in a database.

In the present example, the memory storage unit 90 is not particularly limited and may include a non-transitory machine-readable storage medium that may be any electronic, magnetic, optical, or other physical storage device. In addition to data received from an apparatus 50 or other data collection device, the memory storage unit 90 may be used to store instructions for general operation of the apparatus 80 and its components, such as the aggregator 95. In particular, the memory storage unit 90 may store an operating system that is executable by a processor to provide general functionality to the apparatus 80, for example, functionality to support various applications. In particular, the instructions may be used by a processor to carry out various functions. Furthermore, the memory storage unit 90 may also store control instructions to operate other components and peripheral devices of the apparatus 80, such displays and other user interfaces.

The aggregator 95 is in communication with the memory storage unit 90 and is to combine at least one two-dimensional whole skeleton with additional data, such as a different two-dimensional whole skeletons from a different vantage point to generate a three-dimensional skeleton representing a subject of an image. By combining multiple three-dimensional skeletons as a function of time to capture motion of the subject over time. It is to be appreciated that number of whole skeletons generated by an apparatus 50 that the aggregator 95 may combine is not limited.

The manner by which the aggregator 95 combines the two-dimensional skeletons is not particularly limited. In the present example, each whole skeleton includes fine features and coarse features generated by combining the results from multiple pose estimation engines. The joints in one of two-dimensional whole skeletons may be correlated with corresponding joints in another two-dimensional whole skeleton such that the other two-dimensional whole skeletons are combined and merged to form a three-dimensional skeleton. By knowing the position from which each of the two-dimensional skeletons is known, stereoscopic techniques may be used to triangulate the three-dimensional whole skeleton based on the two-dimensional whole skeletons.

Accordingly, by combining multiple two-dimensional whole skeletons having fine features and coarse features, a three-dimensional skeleton may capture the motion of a subject. The motion capture of the entire subject is to appear more natural. In particular, the motion of the coarse joints in the three-dimensional skeleton as well as fine joints, such as the hands and fingers, may be captured and rotated naturally in three-dimensions. In some examples, the joints and or rotations may be further smoothed or filtered using filtering techniques, such as a Kalmann filter to reduce noise.

Figure 3:
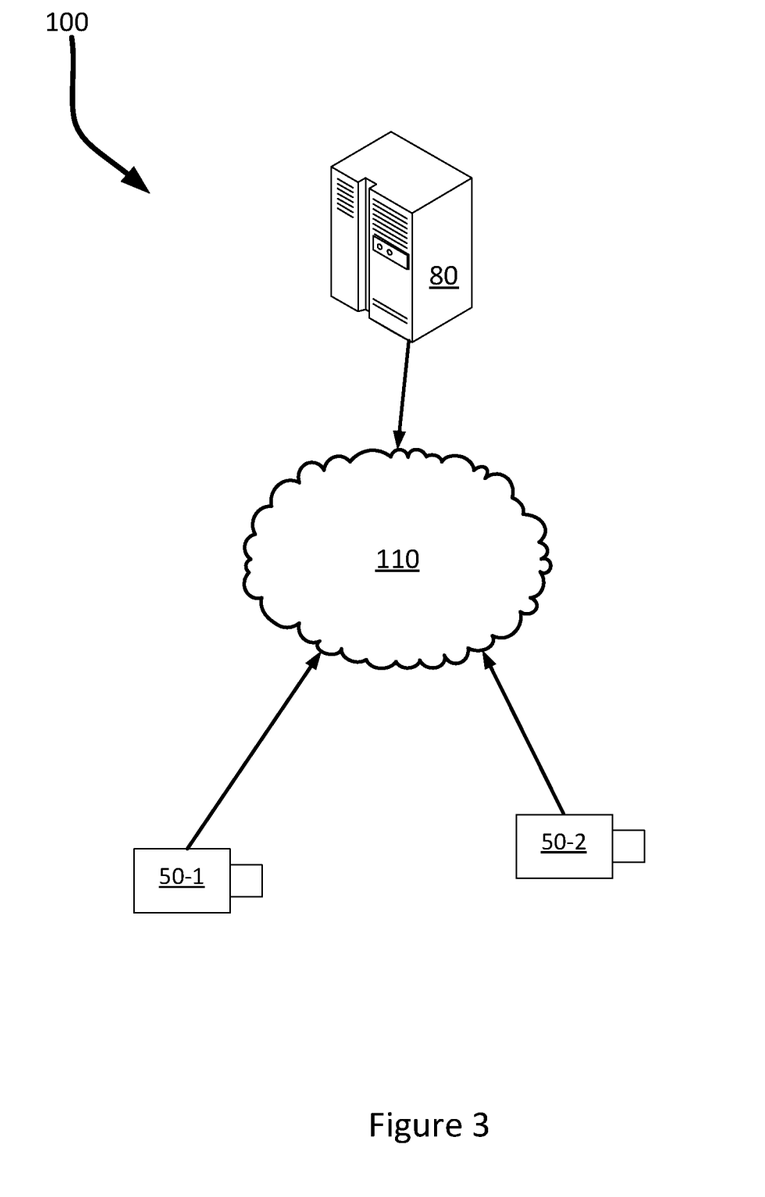
FIG. 3 is a representation of an example system to infer a joint rotation from an external source.

Referring to FIG. 3, a schematic representation of a computer network system is shown generally at 100. It is to be understood that the system 100 is purely exemplary and it will be apparent to those skilled in the art that a variety of computer network systems are contemplated. The system 100 includes the apparatus 80 and a plurality of apparatus 50-1 and 50-2 connected by a network 110. The network 110 is not particularly limited and may include any type of network such as the Internet, an intranet or a local area network, a mobile network, or a combination of any of these types of networks. In some examples, the network 110 may also include a peer to peer network.

In the present example, the apparatus 50-1 and the apparatus 50-2 are not limited may be any type of image capture and processing device used to generate whole skeletons using a two-step pose estimation process where fine details in a region of interest are inferred as well as coarse details. The apparatus 50-1 and the apparatus 50-2 communicate with the apparatus 50 over the network 110 for providing whole skeletons from which a three-dimensional skeleton is to be generated.

Accordingly, the apparatus 50-1 may be substantially similar to the apparatus 50-2 and include the components described above in connection with the apparatus 50. Each of the apparatus 50-1 and the apparatus 50-2 may be mounted at different vantage points and positioned to capture the subject. Accordingly, each of the apparatus 50-1 and the apparatus 50-2 may generate a two-dimensional skeleton of the subject to be transmitted to the aggregator 95 in the apparatus 80 via the network 110.

Figure 4:
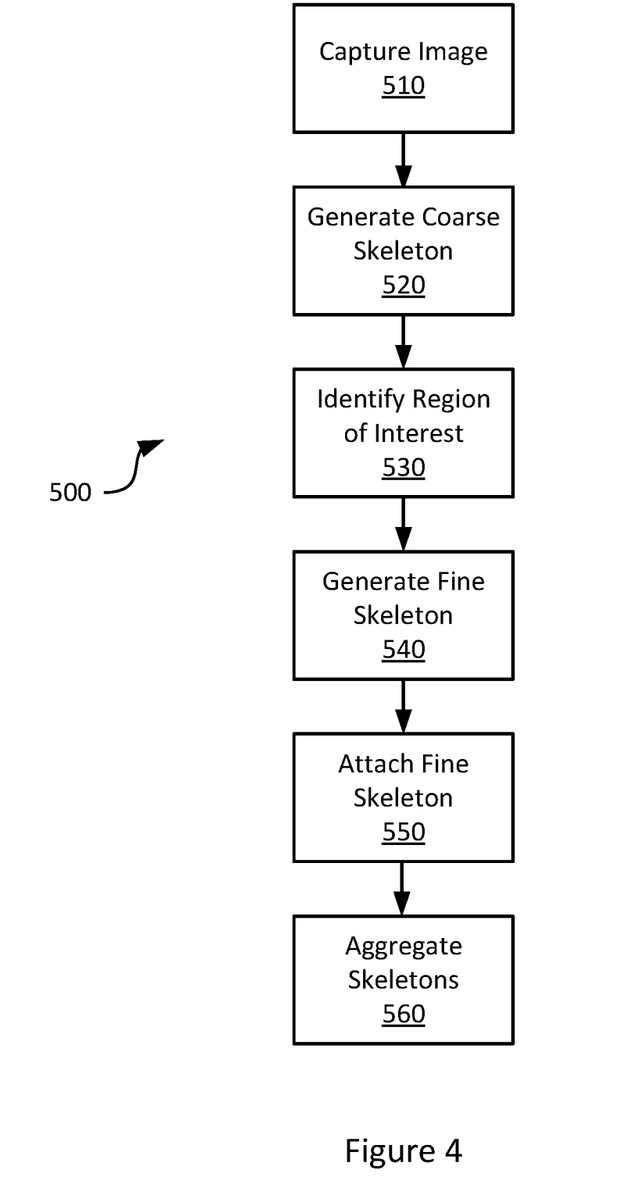
FIG. 4 is a flowchart of an example of a method of markerless motion capture.

Referring to FIG. 4, a flowchart of an example method of capturing three-dimensional motion without the use of markers is generally shown at 500. In order to assist in the explanation of method 500, it will be assumed that method 500 may be performed by the system 100. Indeed, the method 500 may be one way in which the system 100 may be configured. Furthermore, the following discussion of method 500 may lead to a further understanding of the system 100 and it components, such as the apparatus 50-1, the apparatus 50-2, and the apparatus 80. In addition, it is to be emphasized, that method 500 may not be performed in the exact sequence as shown, and various blocks may be performed in parallel rather than in sequence, or in a different sequence altogether.

Beginning at block 510, the apparatus 50-1 captures an image of a subject using a camera. In the present example, it is to be understood that the apparatus 50-2 may be operating in parallel to capture an image of the same subject using a camera mounted at a different vantage point.

Next, at block 520, a coarse skeleton may be generated from the image captured in block 510. In examples, where the apparatus 50-1 and the apparatus 50-2 operate in parallel, separate coarse skeletons may be generated. In the present example, the coarse skeletons generated at block 520 may represent the entire body of the subject in two-dimension. Accordingly, it is to be appreciated that finer details of the subject may not be processed with significant detail by the respective pose estimation engine. The manner by which the coarse skeleton is generated is not particularly limited. For example, a pose estimation engine may apply a machine learning technique to the image. The machine learning technique may be a neural network to generate the coarse skeleton and to infer joint positions and rotations. In a particular, a convolutional neural network may be used in some examples to infer the joint positions and rotations. Furthermore, to reduce the computational load for carrying out the processing of the image, the resolution of the original image may be reduced for this step. Alternatively, instead of processing each frame to generate a coarse skeleton, a sample of the frames may be processed.

Block 530 involves identifying a region of interest in the original image captured by at block 510. The region of interest may be identified based on the coarse skeleton generated at block 520. For example, a feature recognition process may be carried out on the coarse skeleton to identify potential regions of interest where a fine skeleton is to be generated. As a specific example, if the subject is a human, the hands of the coarse skeleton may be identified as a region of interest.

Upon the identification of the region of interest, a fine skeleton of the region of interest is to be generated at block 540. The manner by which the fine skeleton is generated is not particularly limited. For example, a pose estimation engine may apply a machine learning technique to a cropped portion the original image. In examples where the execution of block 520 reduced the resolution of the image, it is to be appreciated that the original resolution image may be used to capture more details of the region of interest. The machine learning technique may be a neural network to generate the fine skeleton and to infer joint positions and rotations. In a particular, a convolutional neural network may be used in some examples to infer the joint positions and rotations.

Next, block 550 comprises attaching the fine skeleton generated at block 540 to the coarse skeleton generated at block 520 to form a whole skeleton. The manner by which the fine skeleton is attached to the coarse skeleton is not particularly limited. In the present example, the attachment engine 70 may replace the portion of the coarse skeleton generated at block 520 and replace the portion with the fine skeleton generated at block 540 which may have more joint positions with associated rotations.

Furthermore, the execution of block 550, such as by the attachment engine 70, may involve smoothing the transition from the fine skeleton to the coarse skeleton. The smoothing function may involve translating the fine skeleton relative to the coarse skeleton to align an attachment point if the generation of the fine skeleton and the coarse skeleton created a discontinuity when the region of interest is simply replaced. The smoothing function may also involve scaling the proportions of the fine skeleton to match the proportions of the coarse skeleton.

Block 560 aggregates the whole skeleton generated at block 550 with additional data to form a three-dimensional skeleton. For example, the two-dimensional whole skeletons from multiple vantage points may be used to generate a three-dimensional skeleton using various three-dimensional imaging techniques. In this example, the additional two-dimensional skeletons may be the additional data used in the execution of block 560. In other examples, other types of data may be used to estimate depth in the two-dimensional whole skeletons.

It should be recognized that features and aspects of the various examples provided above may be combined into further examples that also fall within the scope of the present disclosure.

What is claimed is:

1. An apparatus for generating a three-dimensional (3D) skeleton with coarse and fine grain regions, the apparatus comprising:
   a camera configured to capture an image of a subject;
   a first pose estimation engine configured to:
     receive the image,
     generate a coarse skeleton of the image using a first convolutional neural network that infers body joint positions of the subject, and
     identify a region of the image based on the coarse skeleton;
   a second pose estimation engine configured to:
     receive the region of the image, and
     generate a fine skeleton of the region of the image using a second convolutional neural network that infers hand joint positions of a hand of the subject;
   an attachment engine to generate a whole skeleton, wherein the whole skeleton includes the fine skeleton attached to the coarse skeleton; and
   a communications interface to transmit the whole skeleton to an aggregator, wherein the aggregator is to generate a three-dimensional skeleton based on the whole skeleton and additional data.

2. The apparatus of claim 1, wherein the coarse skeleton generated by the first pose estimation engine represents a whole body of the subject.

3. The apparatus of claim 1, wherein the fine skeleton generated by the second pose estimation engine represents only the hand of the subject.

4. The apparatus of claim 1, wherein the attachment engine is to scale the fine skeleton to combine with the coarse skeleton.

5. The apparatus of claim 1, wherein the attachment engine is to translate the fine skeleton to combine with the coarse skeleton.

6. The apparatus of claim 1, wherein the first pose estimation engine is to reduce a resolution of the image to generate the coarse skeleton, and wherein the second pose estimation engine is to use the image at full resolution to generate the fine skeleton.

7. A method for generating a three-dimensional (3D) skeleton with coarse and fine grain regions, the method comprising:
   capturing an image of a subject with a camera;
   generating a coarse skeleton of the image by applying a first convolutional neural network that infers positions of body joints in the image, wherein the coarse skeleton is two-dimensional;
   identifying a region of interest in the image based on the coarse skeleton;
   generating a fine skeleton of the region of interest by applying a second convolutional neural network that infers positions of hand joints in the region of interest, wherein the fine skeleton is two-dimensional;

attaching the fine skeleton to a portion of the coarse skeleton to form a whole skeleton; and aggregating the whole skeleton with additional data to form a three-dimensional skeleton.

8. The method of claim 7, wherein attaching the fine skeleton to the portion of the coarse skeleton comprises scaling the fine skeleton to match the portion of the coarse skeleton.

9. The method of claim 7, wherein attaching the fine skeleton to the portion of the coarse skeleton comprises translating the fine skeleton to match the portion of the coarse skeleton.

10. The method of claim 7, further comprising reducing a resolution of the image to generate the coarse skeleton.

11. An apparatus for generating a three-dimensional (3D) skeleton with coarse and fine grain regions, the apparatus comprising:

a first camera to capture a first image of a subject;

a first pose estimation engine to receive the first image, the first pose estimation engine to generate a first coarse skeleton of the first image, the first pose estimation engine further to identify a first region of the first image based on the first coarse skeleton;

a second pose estimation engine to receive the first region, the second pose estimation engine to generate a first fine skeleton of the first region of the first image;

a first attachment engine to generate a first whole skeleton, wherein the first whole skeleton includes the first fine skeleton attached to the first coarse skeleton;

a second camera to capture a second image of the subject, wherein the second image is captured from a different perspective than the first camera;

a third pose estimation engine to receive the second image, the third pose estimation engine to generate a second coarse skeleton of the first image, the third pose estimation engine further to identify a second region of the second image based on the second coarse skeleton;

a fourth pose estimation engine to receive the second region, the fourth pose estimation engine to generate a second fine skeleton of the second region of the second image;

a second attachment engine to generate a second whole skeleton, wherein the second whole skeleton includes the second fine skeleton attached to the second coarse skeleton; and an aggregator to receive the first whole skeleton and the second whole skeleton, the aggregator to generate a three-dimensional skeleton from the first whole skeleton and the second whole skeleton.

12. The apparatus of claim 11, wherein the first coarse skeleton generated by the first pose estimation engine represents a body of the subject.

13. The apparatus of claim 11, wherein the first attachment engine is to scale the first fine skeleton to combine with the first coarse skeleton.

14. The apparatus of claim 11, wherein the first attachment engine is to translate the first fine skeleton to combine with the first coarse skeleton.

15. The apparatus of claim 11, wherein the first pose estimation engine is to reduce a resolution of the first image to generate the first coarse skeleton, and wherein the second pose estimation engine is to use the first image at full resolution to generate the first fine skeleton.

16. The apparatus of claim 11, wherein the second coarse skeleton generated by the third pose estimation engine represents a body of the subject.

17. The apparatus of claim 16, wherein the second fine skeleton generated by the second pose estimation engine represents a hand of the subject.

18. The apparatus of claim 11, wherein the second attachment engine is to scale the second fine skeleton to combine with the second coarse skeleton.

* * * * *